United States Patent
Fahndrich et al.

(10) Patent No.: US 9,904,541 B2
(45) Date of Patent: Feb. 27, 2018

(54) SEMANTIC BASELINING

(71) Applicant: Microsoft Corporation, Redmond, WA (US)

(72) Inventors: Manuel Fahndrich, King County, WA (US); Shuvendu Lahiri, Redmond, WA (US); Francesco Logozzo, Issaquah, WA (US); Sam Blackshear, Boulder, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 104 days.

(21) Appl. No.: 13/890,247

(22) Filed: May 9, 2013

(65) Prior Publication Data

US 2014/0337819 A1 Nov. 13, 2014

(51) Int. Cl.
G06F 9/44 (2006.01)
G06F 11/36 (2006.01)

(52) U.S. Cl.
CPC .............. G06F 8/71 (2013.01); G06F 8/75 (2013.01); G06F 11/3608 (2013.01)

(58) Field of Classification Search
CPC ... G06F 8/71; G06F 8/75; G06F 11/36; G06F 11/3604; G06F 11/3608; G06F 21/577
See application file for complete search history.

(56) References Cited

U.S. PATENT DOCUMENTS

| | | | |
|---|---|---|---|
| 5,590,329 A * | 12/1996 | Goodnow et al. | 717/144 |
| 6,658,645 B1 * | 12/2003 | Akuta | G06F 8/24 |
| | | | 714/25 |
| 6,978,443 B2 | 12/2005 | Flanagan et al. | |
| 7,340,726 B1 * | 3/2008 | Chelf | G06F 8/71 |
| | | | 714/38.12 |
| 7,421,680 B2 * | 9/2008 | DeLine et al. | 717/126 |
| 7,873,949 B2 * | 1/2011 | Sandys et al. | 717/143 |
| 7,890,453 B2 * | 2/2011 | Dick et al. | 707/608 |
| 8,726,254 B2 * | 5/2014 | Rohde et al. | 717/154 |
| 8,935,674 B2 * | 1/2015 | Pistoia et al. | 717/126 |

(Continued)

FOREIGN PATENT DOCUMENTS

CN 101356535 A 1/2009

OTHER PUBLICATIONS

Leino, et al., "Generating error traces from verification-condition counterexamples"; 2004 Elsevier; [retrieved on Oct. 31, 2014]; Retrieved from Internet <URL:http://cs.ucla.edu/~todd/research/scp05.pdf>;pp. 209-226.*

(Continued)

Primary Examiner — Geoffrey St Leger
(74) Attorney, Agent, or Firm — Medley, Behrens & Lewis, LLC

(57) ABSTRACT

Described herein are technologies pertaining to semantic baselining. Correctness conditions of a baseline program are inferred based upon a first static analysis undertaken over the baseline program. The correctness conditions are subsequently inserted into a revision to the baseline program. When a second static analysis is undertaken over the revised program with the correctness conditions inserted therein, warnings inherited from the baseline program are suppressed, while warnings caused by revisions are surfaced to a developer.

20 Claims, 6 Drawing Sheets

(56) References Cited

U.S. PATENT DOCUMENTS

| | | | |
|---|---|---|---|
| 2002/0133806 A1* | 9/2002 | Flanagan | G06F 9/44589 717/123 |
| 2005/0229159 A1 | 10/2005 | Haba et al. | |
| 2007/0006151 A1* | 1/2007 | Conway et al. | 717/120 |
| 2007/0283321 A1* | 12/2007 | Hegde | G06F 8/71 717/110 |
| 2007/0288899 A1* | 12/2007 | Fanning | G06F 8/75 717/124 |
| 2009/0125887 A1* | 5/2009 | Kahlon | G06F 11/3604 717/126 |
| 2010/0223593 A1* | 9/2010 | Eldridge et al. | 717/105 |
| 2012/0222009 A1* | 8/2012 | Ayewah | G06F 8/75 717/124 |
| 2013/0111441 A1* | 5/2013 | Clemm | G06F 8/71 717/121 |
| 2013/0152055 A1* | 6/2013 | Joshi et al. | 717/131 |

OTHER PUBLICATIONS

Ramanathan, et al., "Static Specification Inference Using Predicate Mining"; 2007 ACM; [retrieved on Oct. 31, 2014]; Retrieved from Internet <URL:http://dl.acm.org/citation.cfm?id=1250749>>;pp. 123-134.*

Dilling, et al., "Static Error Detection using Semantic Inconsistence Inference"; [retrieved on Oct. 31, 2014]; Retrieved from Internet <URL:http://dl.acm.org/citation.cfm?id=125078>;pp. 435-445.*

Ivancid, et al., "Scalable and scope-bounded software verification"; 2014 Springer; [retrieved on Oct. 30, 2014]; Retrieved from Internet <URL:http://link.springer.com/article/10.1007/s10515-014-0164-0#page-1>;pp. 1-43.*

Spacco, J., et al., Tracking Defect Warnings Across Versions, Proceedings of the 2006 international workshop on Mining software repositories, May 22-23, 2006, pp. 133-136, [retrieved on Nov. 27, 2017], Retrieved from the Internet: <URL:http://dl.acm.org/>.*

Heckman, S., et al., A Model Building Process for Identifying Actionable Static Analysis Alerts, International Conference on Software Testing Verification and Validation, 2009, 10 pages, [retrieved on Nov. 27, 2017], Retrieved from the Internet: <URL:http://ieeexplore.ieee.org/>.*

"Suppression of False Alarms", Retrieved at <<http://www.viva64.com/en/d/0021/#ID0EP6CI>>, Oct. 20, 2011, pp. 1-13.

Ayewah, et al., "Evaluation Static Analysis Defect Warnings on Production Software", Retrieved at <<http://findbugs.cs.umd.edu/papers/FindBugsExperiences07.pdf>>, In proceedings of the ACM SIGPLAN-SIGSOFT Workshop on Program Analysis for Software Tools & Engineering, Jun. 13, 2007, pp. 1-7.

Tarak Goradia, "Dynamic Impact Analysis: Analyzing Error Propagation in Program Executions", Retrieved at <<http://www.cs.nyu.edu/web/Research/Theses/goradia_tarak.pdf>>, In PhD Thesis, New York University, Nov. 1993, pp. 1-221.

Fehnker, et al., "Automatic Bug Detection in Microcontroller Software by Static Program Analysis", Retrieved at <<http://citeseerx.ist.psu.edu/viewdoc/download?doi=10.1.1.149.5306&rep=rep1&type=pdf>>, In Proceedings of the 35th Conference on Current Trends in Theory and Practice of Computer Science, Jan. 24, 2009, pp. 1-12.

Emanuelsson, et al., "A Comparative Study of Industrial Static Analysis Tools (Extended Version)", Retrieved at <<http://liu.diva-portal.org/smash/get/diva2:330560/FULLTEXT01>>, In Technical Reports in Computer and Information Science, Jan. 7, 2008, pp. 1-34.

Anderson, Dr. Paul, "The Use and Limitations of Static-Analysis Tools to Improve Software Quality", Retrieved at <<https://buildsecurityin.us-cert.gov/bsi/1188-BSI/version/4/part/4/data/0806Anderson.pdf?branch=main&language=default>>, In the Journal of Defense Software Engineering, Jun. 2008, pp. 1-4.

"International Search Report & Written Opinion for PCT Application No. PCT/US2014/037225", dated Aug. 22, 2014, 9 Pages.

Logozzo, et al., "Verification Modulo Versions: Towards Usable Verification", In Proceedings of the 35th ACM SIGPLAN Conference on Programming Language Design and Implementation, Jun. 9, 2014, pp. 294-304.

"Response to the Office Action for Chinese Patent Application No. 201480026218.2", Filed Date: Aug. 2, 2017, 35 pages.

"Office Action for Chinese Patent Application No. 201480026218.2", dated Mar. 22, 2017, 10 Pages.

* cited by examiner

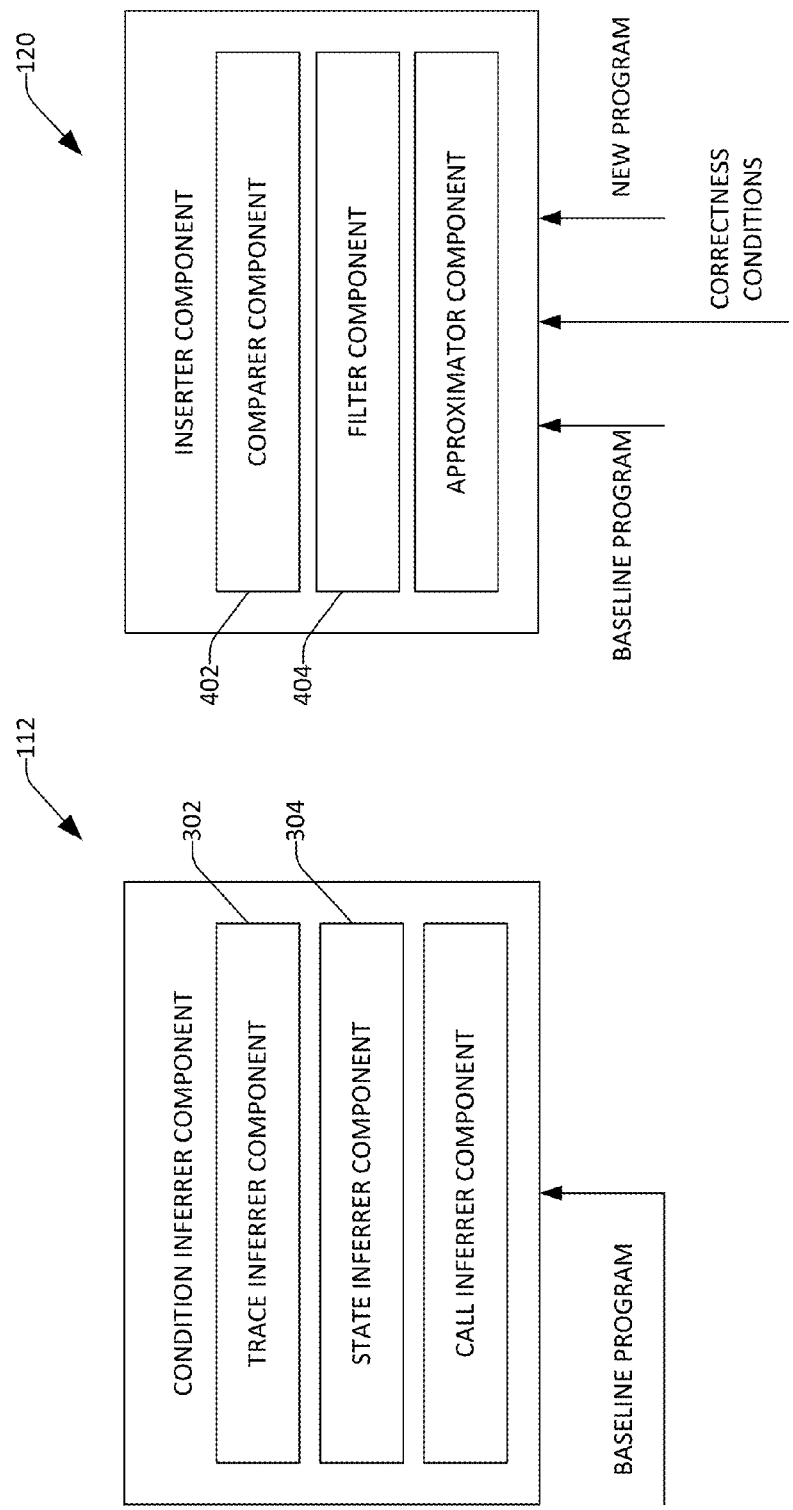

SEMANTIC BASELINING

BACKGROUND

Computer programs developed by program developers are oftentimes relatively large and complex. For instance, source code of an operating system can include hundreds of thousands to millions of lines of code, wherein different portions of the code are written by different developers over varying time frames. Because developers are often unable to surmise all possible executions through source code, unforeseen errors can occur at runtime of a program. For example, certain variable values, events, execution paths, some combination thereof, etc. may cause the program to operate in an unexpected/undesirable manner when executed (e.g., the program includes potential bugs). To detect bugs, static analysis and verification tools have been developed.

A static analysis and verification tool analyzes computer-executable code to identify potential bugs that may occur during program execution, such as null pointer exceptions, division by zero errors, array out of bounds errors, and the like. In certain instances, a developer provided with warnings may wish to ignore such warnings, as the bugs may be spurious or not worth fixing (e.g., fixing a bug may cause more severe problems in the program). Going forward, then, the developer may wish to have these "old" warnings suppressed, as the developer has already reviewed the warnings, and re-provision of the same warnings is superfluous. In other words, suppressing warnings may allow the developer to be notified only of issues caused by the addition of new features to the program.

Using conventional static analysis and verification tools, the options of the developer are either to 1) add assume statements to the code to suppress each undesired warning; or 2) suppress warnings via attributes or alarm filter files. These approaches have numerous drawbacks. For instance, the first option allows the developer to make assumptions explicit, but this is only an advantage if such assumptions are interesting to the developer. Moreover, inserting assumptions requires manual effort proportional to the number of warnings emitted by the tool that are desirably suppressed by the developer. Still further, the developer must manually refactor any assumptions as changes to the program are made. With respect to the second option noted above, warnings can be suppressed by way of syntactic matches between warning messages, warning types, or warning locations. Thus, for instance, the developer can indicate that any warnings at line i of a program is to be suppressed when new versions of the program are analyzed.

With more generality, the developer can add a suppression attribute (or an entry in an alarm filter file) after manual inspection of a warning; such syntax-based suppressions, however, can be quite brittle, in that small changes to a program can cause syntactic matching to fail. Failed suppression can then cause alarms to be re-reported that have already been classified as spurious by the developer, thereby causing confusion and irritation. Further, using syntactic matching may unintentionally suppress warnings that are, in fact, genuinely new (e.g., caused by a revision to a program). For instance, a line-based suppression strategy may desirably suppress all warnings about an assertion failure at line i of a program. Accordingly, a warning based on an assertion $a_0$ at line i may be suppressed in an original program. If, however, the developer inserts a new and potentially failing assertion $a_1$ at line i in the program, thereby shifting $a_0$ back to line i+1, the warning about the failure of $a_1$ will be (wrongly) suppressed, and the warning about the failure of $a_0$ will be (wrongly) reported.

SUMMARY

The following is a brief summary of subject matter that is described in greater detail herein. This summary is not intended to be limiting as to the scope of the claims.

Described herein are various technologies pertaining to semantic baselining, which refers to suppression of warnings in a computer-executable program as a function of semantic understanding of the causes of such warnings. With more particularity, a first version of a computer program (a baseline program) can be received and a static analysis can be executed thereover. The static analysis over the baseline program is a semantic analysis of such computer program, resulting in identification of possible bugs that may occur when the program is executed. When bugs are identified, warnings can be set forth to a developer, wherein exemplary warnings may include an indication to the developer that a null pointer exception may occur when executing the baseline program, that a divide by zero error may occur when executing the baseline program, that an array out of bounds error may occur when executing the baseline program, and the like. Each identified warning corresponds to a respective location in the baseline program.

A developer may then indicate that at least one warning output for the baseline program based upon the static analysis thereover is to be suppressed going forward, such that warnings deemed spurious or not worth fixing by the developer are not re-reported to the developer as the developer makes changes to the baseline program. Thus, the developer may indicate that she only wishes to be provided with potential errors caused by modifications to the baseline program. Thereafter, a second version of the computer program (a new program) can be received, which is non-identical to the baseline program. That is, the new program is in some way an update to the baseline program.

A developer may then indicate that at least one warning output for the baseline program based upon the static analysis thereover is to be suppressed going forward, such that warnings deemed spurious or not worth fixing by the developer are not re-reported the developer as the developer makes changes to the baseline program. Thus, the developer may indicate that she only wishes to be provided with potential errors caused by modifications to the baseline program. Thereafter, a second version of the computer program (a new program) can be received, which is non-identical to the baseline program. That is, the new program is in some way an update to the baseline program.

Assumptions of respective conditions inferred with respect to the baseline program may then be inserted into the new program at respective appropriate locations. When the new program is analyzed by a static analysis and verification tool, the assumptions of the semantic conditions are read and understood by the analysis tool; such conditions can act to suppress old warnings from the baseline program (the warnings desirably indicated as being suppressed by the developer). Warnings caused by modifications made by the developer to the baseline program, however, are still provided to the developer, thereby providing the developer with an opportunity to fix new bugs.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 3 illustrates a functional block diagram of a condition inferrer component that is configured to infer correctness conditions that cause warnings in a baseline program to be suppressed when analyzed by a static analysis and verification tool.

FIG. 4 is a functional block diagram of an exemplary inserter component that is configured to insert assumptions of inferred correctness conditions into a computer-executable program.

DETAILED DESCRIPTION

Figure 1:
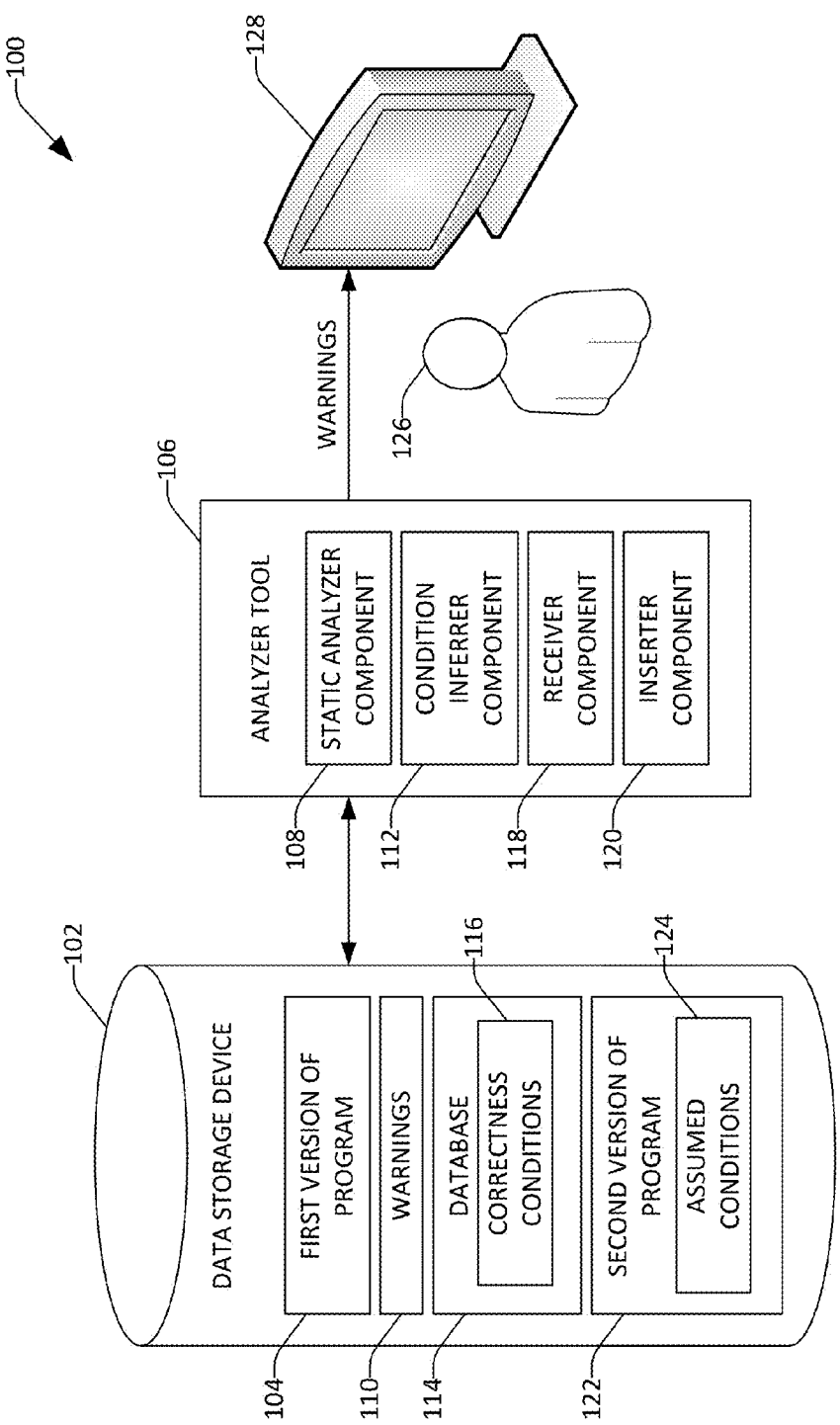
FIG. 1 is a functional block diagram of an exemplary system that facilitates inserting assumptions of correctness conditions into a computer-executable program.

Various technologies pertaining to warning suppression in computer-executable programs are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Described herein is the notion of semantic baselining. "Baselining" refers to baselining alarms/warnings reported by static analysis and verification tools. Specifically, given two versions of a program, P and P', the baseline problem involves reporting to the user only new alarms introduced in P'. At a high level, semantic baselining involves extraction of correctness conditions that suppress alarms in P and injection of such conditions into P'. Accordingly, semantic baselining masks alarms of P' that have the same semantic cause as the alarms in P. As will be described herein, an abstract interpretation-based framework for cross program version condition extraction and injection formalizes semantic baselining.

With reference now to FIG. 1, an exemplary system 100 that facilitates inferring correctness conditions from a baseline program and injecting assumptions of such correctness conditions into a subsequent version of the baseline program is illustrated. The system 100 includes a data storage device 102, which retains a first version of a computer executable program 104 (a baseline program). The data storage device 102 may be any suitable storage device, such as, but not limited to, a hard drive, a memory, a flash drive, a disk, etc. The system 100 further comprises an analyzer tool 106, which is configured to perform static analysis and verification over computer executable programs. For instance, the analyzer tool 106 may be included in an integrated development environment. The analyzer tool 106, when analyzing the baseline program, can perform a deep semantic analysis of the baseline program to identify possible bugs therein. To that end, the analyzer tool 106 includes a static analyzer component 108 that performs a first static analysis over the baseline program. The static analyzer component 108 can identify a plurality of warnings 110 based upon the first static analysis over the baseline program, and cause such warnings to be retained in the data storage device 102. Each warning in the warnings 110 can correspond to a respective location (line of code) in the baseline program. Exemplary warnings may include, for example, null pointer exceptions, division by zero warnings, array out of bounds warnings, violation of assertion contracts set forth by a developer for the baseline program, etc.

The analyzer tool 106 may also include a condition inferrer component 112 that infers, for each warning in the warnings 110, corresponding correctness conditions. Summarily, a correctness condition corresponding to a warning, when assumed in the baseline program, causes the warning to be suppressed when the static analyzer component 108 performs a static analysis over the baseline program. The data storage device 102 may further include a database 114, and correctness conditions 116 inferred by the condition inferrer component 112 can be retained in the database 114. Generally, the correctness conditions 116 are conditions that the surrounding environment of the baseline program (e.g. callers, other methods, native calls, physical environment, etc.) should satisfy, otherwise an error may occur when executing the baseline program.

A developer of the baseline program may indicate that at least one warning in the warnings 110 is desirably suppressed going forward, such that the developer, when revising the baseline program, is only provided with new warnings caused by revisions to the baseline program.

The analyzer tool 106 also comprises a receiver component 118 that receives a correctness condition (inferred by the condition inferrer component 112) from the database 114. The analyzer tool 106 also includes an inserter component 120 that inserts an assumption of the condition into a second version of the program 122 (referred to as the new program). That is, the inserter component 120 inserts assumed conditions into the new program, such that the static analyzer component 108 takes the assumed conditions 124 into consideration when performing a static analysis over the new program. Accordingly, "old" errors propagated from the baseline program to the new program are suppressed, while a developer 126 is provided with "new" warnings caused by revisions included in the new program. In an exemplary embodiment, the inserter component 120 can insert an assumption of a condition at a method call in the new program. In another example, the inserter component 120 can insert an assumption of a condition at a function entry point in the new program. The analyzer tool 106 can cause such new warnings to be presented to the developer 126 on a display screen 128 of a computing device. Subsequently, the developer 126 can choose whether or not to fix these newly existent warnings.

Thus, the static analyzer component 108 can perform a second static analysis over the new program, wherein the new program includes assumed conditions 124 corresponding to the respective warnings 110 identified when the first static analysis was undertaken over the baseline program. Therefore, if the static analyzer component 108 outputs a warning to the developer 126 and displays such warning on the display screen 128, such warning indicates to the developer 126 that a revision existent in the new program 122 has caused such warning. If, however, the static analyzer component 108 fails to output a particular warning when performing a static analysis over the new program, then it can be determined that such warning has been suppressed.

Additional detail pertaining to operation of the system 100 is now provided. As indicated, the data storage device 102 includes two versions of a program: the baseline program (P), and an updated new program (P'). The static analyzer component 108 outputs the warnings 110 ($a_p$) based upon a static analysis over P, and (if warnings are not suppressed) outputs warnings $a_{p'}$ for P'. When suppression of $a_p$ is desired for the new program, the system 100 is configured to emit the set of warnings $a_p/a_{p'}$, thus presenting only new alarms to the developer 126.

If an oracle function δ were known that maps program points from P to program points from P', solving the baselining problem would be relatively easy. For instance, for a warning at line i in P, the warning at line δ(i) in P' can be identified and suppressed. Constructing the δ function, however, is difficult in practice, and relies on syntactic similarities between the two versions of the program that may or may not correspond to semantic similarities. The condition inferrer component 112 is configured to extract correctness conditions ε for the baseline program and install ε into the new program, thereby producing an instrumented program P'$_ε$. The analyzer tool 106 then emits the set of alarms reported for P'$_ε$.

Although a complete δ may be needed to match warnings in P to warnings in P', only sources of uncertainty across the baseline program and the new program are needed to install the correctness conditions ε. Since the developer 126 is typically interested in suppressing false warnings that stem from analysis imprecision, the inferred correctness conditions typically concern sources of imprecision. By focusing on the sources of imprecision, the full syntactic matching problem can be reduced to an easier problem of matching a few identifiable locations, thereby improving effectiveness of baselining.

Various examples are set forth herein, which are relatively simple imperative programs with "holes," which refer to calls to unknown external functions and input values. Unknown functions are a source of imprecision regardless of the granularity of the analysis (modular, whole program, etc.), and the analyzed language (Java/C sharp, C/C++, Assembly, etc.). For instance, Java programs frequently use the Java native interface, which allows calling C code from Java. A C analyzer will encounter operating system calls, whose code may only be available in binary form. Even a binary level analyzer may encounter statically unknown data via interaction with the disk, network or user. Unknown functions can also be used to model pieces of code that the analyzer tool 106 cannot understand or reason about precisely, such as complex loops or synchronization patterns, as well as global variables.

Figure 2:
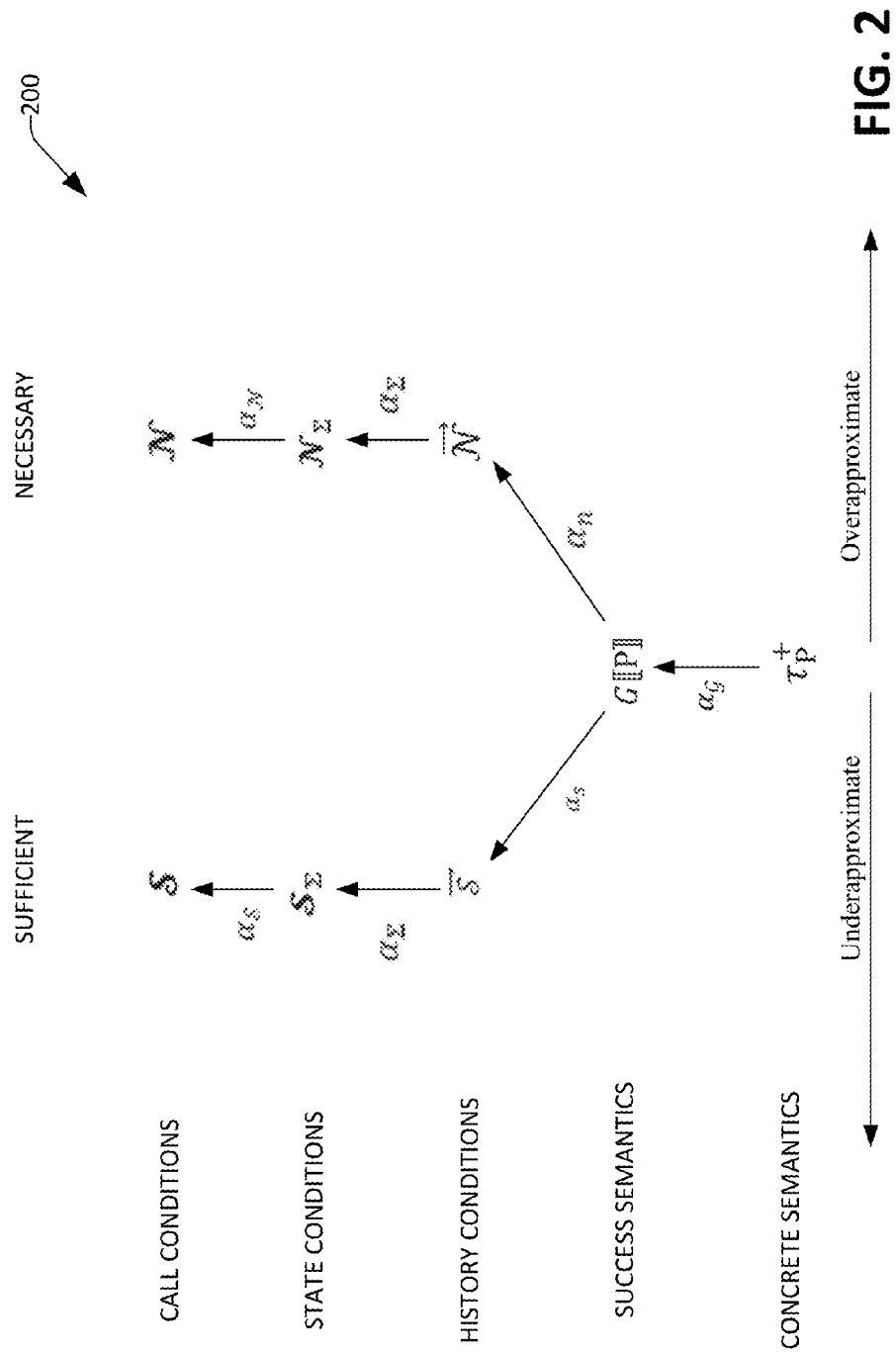
FIG. 2 illustrates a diagram of correctness condition extraction.

Referring now to FIG. 2, an exemplary diagram 200 depicting correctness condition extraction (inference) that can be performed by the condition inferrer component 112, is illustrated. The diagram 200 summarizes a framework for extracting correctness conditions from the baseline program P. At the lowest level in the diagram 200 is the trace semantics $τ_P^+$, which capture all finite executions of P. By abstracting away all traces in $τ_P^+$ that lead to an error state via the abstraction function $α_G$, the success semantics G[[P]] can be obtained. The success semantics captures only the good executions of the program P.

Given such success semantics, the goal of the condition inferrer component 112 is to extract correctness conditions—assumptions that must be made about the environment to ensure good traces. As the fork in the diagram 200 illustrates, two choices for the strength of the correctness conditions can be considered: 1) sufficient conditions; or 2) necessary conditions. A sufficient condition guarantees that the baseline program P always reaches a non-error state, while a necessary condition expresses that if the condition does not hold, the baseline program P definitely reaches an error state. Otherwise stated, if a sufficient condition does not hold, the program may or may not reach a bad state. If a necessary condition does not hold, then the program definitely will reach a bad state. The following examples illustrate the difference between sufficient and necessary correctness conditions.

```
Sufficient( ):
    0:    ret = g( )
    1:    y = ret
    2:    if *
    3:        assert y > 0
```

The expression * denotes nondeterministic choice. The condition ret>0 (at program point 1) is sufficient for the correctness of the program. When ret is positive, the program will always reach a non-error state, no matter which nondeterministic choice is made. The condition, however, is not necessary because the program may still reach a non-error state even if ret is not positive.

An example illustrating a necessary but not sufficient condition is now set forth with respect to the following exemplary program:

```
Necessary( ):
    0:    ret = g( )
    1:    y = ret;
    2:    if *
```

```
3:       assert y > 0
4: else
5:       assert false
```

The condition ret>0 is necessary for the correctness of the program, but not sufficient. If ret is not positive, then the first assertion will always fail. Since there is no condition that can be up imposed on ret to ensure that the second assertion will not fail, the program has no sufficient correctness condition.

The condition inferrer component 112 can obtain necessary and/or sufficient conditions for a program using suitable abstractions of success semantics. As the diagram 200 illustrates, correctness conditions can be extracted at increasing levels of abstraction. For instance, one option is to extract correctness conditions for sequences of function calls (history conditions $\vec{S}, \vec{N}$) ). Another option is to extract correctness conditions for each program point where a function call appears, e.g. different occurrences of the same function invocation are kept separate (state conditions). A still more abstract option is to merge together calls to the same function (call conditions $S, N$).

It can be noted, in general, that the condition inferrer component 112 is not able to infer the weakest sufficient conditions or strongest necessary conditions because of well-known computability problems. Approximation is used to make such inference tractable in practice. The diagram 200 indicates that weakest sufficient conditions can be under-approximated and strongest necessary conditions can be over-approximated.

As indicated above, once the correctness conditions $\epsilon$ have been extracted from the base program P by the condition inferrer component 112, the inserter component 120 can install such conditions into the new program P'. If history or state conditions were extracted, then the previously mentioned $\delta$ function may be used to map each correctness condition from its program point in P to its corresponding program point in P'. If, however, call conditions are extracted, the task is much easier than constructing the $\delta$ function. This is true because it is much more reliable to map function calls (and entry points) across versions of a program than it is to map arbitrary program points.

Once the correctness conditions $\epsilon$ have been installed in P' to create instrumented program P'$_\epsilon$, results about the relationship between P, P' and P'$_\epsilon$, can be proved. If the extracted correctness conditions $\epsilon$ are sufficient, and the static analyzer component 108 detects an error in P'$_\epsilon$, then this is a regression (e.g., a new bad run) of P' with respect to P. Conversely, if the extracted correctness conditions are necessary and the static analyzer component 108 reports no errors for P'$_\epsilon$, then P' is correct with respect to the environmental assumptions in P. Otherwise stated, sufficient conditions are useful to find new bugs while necessary conditions are useful to prove (relative) correctness.

In an example, reference is made to the programs Sufficient (set forth above) and Sufficient' (set forth below):

```
Sufficient'( ):
0:      ret = g( )
        //assume ret >0
        // read from baseline
1:      y = ret
```

```
2:      z = y−2
3:      if *
4:         assert z > −12
```

With respect to such exemplary programs, a syntactic baselining technique would likely fail to match the alarm from Sufficient( ) with the alarm in Sufficient'( ) because the line numbers have shifted and the expression being asserted has changed. Using the semantic baselining technique described herein, the (sufficient) conditioned ret>0 is read from the analysis baseline and is installed as an assumption about the return value of g( ). The static analyzer component 108 is able to prove that the assertion holds under this assumption.

In other words, the static analyzer component 108 can show that if Sufficient was correct under the condition ret>0, then the changes made in Sufficient'( ) did not introduce any new errors. It can be noted that any under-approximation of return is greater than zero (e.g., false) allows for the same guarantee. Conversely, using an over-approximation (e.g., true) would report the alarm as a new alarm. It can be noted that the condition read from the baseline is stronger than (e.g., is an under-approximation of) the condition that can be extracted from Sufficient'; ret>−10.

In some instances, the assertion in the new program P' requires stronger environmental hypotheses than the assertion in the baseline program P. The following program is set forth as an example:

```
Sufficient'WithRegression( ):
0:      ret = g( )
        // assume ret > 0
        // read from baseline
1:      y = ret −2
2:      if *
3:         assert y > 0
```

In such program, a syntactic baselining technique that matches based on the expression being asserted, may wrongly suppress the warning since the expression is y>0 in both Sufficient and Sufficient'WithRegression. In contrast, the semantic baselining technique described herein causes a new alarm to be emitted, because the condition ret>0 from Sufficient is no longer strong enough to prove the correctness of the assertion in Sufficient'WithRegression.

Another example with respect to proving fixes is now described with reference to the programs Necessary (the baseline program shown above) and Necessary' (the new program) set forth below:

```
Necessary'( )
0:      ret = g( )
        // assume ret > 0
        // read from baseline
1:      y = ret
2:      if (y % 2 == 1)
3:         assert y > 0
4:      else
5:         assert y > 1
```

Under the necessary correctness assumption ret>0 read from the semantic baseline, the static analyzer component 108 can prove that Necessary' is correct. Accordingly, Necessary' fixed Necessary, since no regression was introduced and the condition that was all only necessary for the correctness of Necessary is sufficient for the correctness of Necessary'.

Formalization of semantic correctness condition extraction and insertion using Abstract Interpretation is now be described. First, concrete semantics of the baseline program are described as a sequence of states. With respect to syntax, a relatively simple block language can be considered. Basic statements are assignments, assertions, assumptions and function calls:

$$\text{Stm} ::= x = e \mid \text{assert } e \mid \text{assume } e \mid$$
$$\text{ret} = f(\text{arg}_0, \ldots \text{arg}_n)$$

An expression $e \in \text{Exp}$ is a side effect-free expression. The expression $* \in \text{Exp}$ models non-deterministic choice. To simplify the formal treatment, it can be assumed, without loss of generality, that nondeterministic choices can only appear in assignments (e.g. assert * and assume* are disallowed). Blocks are sequences of statements delimited by ;. In an example, nothing about the structure is assumed, except that the contracts of all function calls are explicitly expanded. That is, if a callee f has a contract that includes a preconditioned pre and post-condition post, then the precondition is asserted and postcondition is assumed as follows:

assert pre; ret=f(arg$_0$, . . . arg$_n$); assume post.

A program is a directed graph whose nodes are blocks. It can be assumed for the purposes of explanation, that a program has a single exit block. The special program points entry and exit denote function entry and exit points. The terms BeforeCall (resp. AfterCall) set can be used to denote the set of program points before (resp. after) some method call.

Concrete states are now described. A program state maps variables x, y . . . $\in$ V to values in $\mathcal{V}$. Some reserved variable names may be assumed, such as arg$_0$, arg$_1$, . . . which are the actual arguments for function calls, and ret is the value returned by a function call. Program states s, s$_0$, . . . belong to a given set of states $\Sigma$. The function $\pi \in \Sigma \rightarrow PC$ maps a state to the corresponding program point, and the function $\pi_s \in \rho \rightarrow \text{Stm}$ maps states to the corresponding statements. Further, the function $\vDash \in (\Sigma \times \text{Exp}) \rightarrow \{\text{true, false}\}$ returns the Boolean value of an expression in a given state. Further, $s \vDash e$ can be written for $\vDash (s, e) = \text{true}$.

Small-step operational semantics is now described. The nondeterministic transition relation $\tau_P \in \wp(\Sigma \times \Sigma)$ associates a state with its possible successors. When clear from the context, $\tau$ can be written instead of $\tau_P$, and $\tau(s, s')$ can be written instead of $\langle s, s' \rangle \in \tau$.

Function calls which can be used to model unknowns from the environment and imprecision in the static analysis undertaken by the static analyzer component 108. It can be assumed that function calls are 1) black boxes (their bodies cannot be inspected, so they can return any value); and 2) side effect-free.

The model of functions used in semantic baselining can be formalized as follows: if $s \in \Sigma$ is the state corresponding to a function call (that is, $\pi_s(s) = \text{ret} = f(\text{arg}_0, \ldots \text{arg}_{n-1})$) than the transition relation is such that $$\forall s' \in \Sigma \cdot \tau(s, s') \Leftrightarrow \exists v \in \mathcal{V} \cdot s' = s[\text{ret} \mapsto v].$$

In general, it can be noted that side effect-free functions need not be deterministic. The model of functions described above accounts for the possibility that a function can be invoked with the same parameters and return a different value.

The set of "initial" states can be defined as $\mathcal{I} \in \Sigma$, and the set of "final" (or blocking) states have no successors: $\mathcal{F} = \{s \in \Sigma \mid \forall s'. \neg \tau(s, s')\}$. The "bad" states $\mathcal{B} \subseteq \mathcal{F}$ correspond to assertion failures, e.g., $$\mathcal{B} = \{s \in \Sigma \mid \pi_s(s) = \text{assert } e \wedge s \vDash \neg e\}.$$

The "good" states $\mathcal{G} \subseteq \mathcal{F}$ are non-failing final states: $\mathcal{G} = \mathcal{F}/\mathcal{B}$.

Maximal trace semantics will now be defined. The concrete semantics of the program P is a set of execution traces. Formally, different choices are possible for the trace semantics, e.g. to take into account one 1) partial or maximal executions; 2) only finite executions; or 3) both. For purposes of explanation, finite maximal traces are discussed.

Traces are sequences of states in $\Sigma$. The empty trace $\epsilon$ has a length 0. A trace $\vec{s} = s_0, s_1, \ldots, s_{n-1}$ has a length n. $s_i$ can be written to refer to the ith state of the traces $\vec{s}$. The set of traces of length $n \geq 0$ is $\Sigma^n$. The set of "finite" traces is $\Sigma^* = \{\epsilon\} \cup \bigcup_{n>0} \Sigma^n$. The good traces are $\mathcal{G}^* = \{\vec{s} \in \Sigma^* \mid s_{n-1} \in \mathcal{G}\}$. Similarly, the bad traces are $\mathcal{B}^* = \{\vec{s} \in \Sigma^* \mid s_{n-1} \in \mathcal{B}\}$. Trace "concatenation" can be defined as sequence juxtaposition, and trace "composition" can be defined as $\vec{s}_0 s \circ s \vec{s}_1 = \vec{s}_0 s \vec{s}_1$. Trace concatenation and composition can be extended to sets of traces.

The execution prefixes define the "partial execution" trace semantics. Partial runs of P of length n are partial executions such that $$\vec{\tau}_P^n = \{\vec{s} \in \Sigma^n \mid \forall i \in [0, n-1) \cdot \tau_P(s_i, s_{i+1})\}.$$

The complete or "maximal" runs of P are those partial runs ending with a blocking state:

$$\vec{\tau}_P^+ = \bigcup_{n>0} \{\vec{s} \in \vec{\tau}_P^n \mid s_0 \in \mathcal{I} \wedge s_{n-1} \in \mathcal{F}\}.$$

It can be noted that while each trace in $\vec{\tau}_P^+$ is finite, the set $\vec{\tau}_P^+$ is in general infinite. This means that while infinite executions are not captured, unbounded non-determinism from data sources, like input variables or values returned from a function, can be captured. For instance, $\text{lfp}_\perp^\sqsubseteq \phi$ can denote, if it exists, the least fixed point of $\phi$ larger than $\perp$ according to some order $\sqsubseteq$. A constructive characterization of the maximal trace semantics can then be given as follows:

$$\vec{\tau}_P^+(\mathcal{I}) = (\text{lfp}_\emptyset^\sqsubseteq \lambda T \cdot \mathcal{F}^1 \cup \vec{\tau}_P^2 \circ T) \cap (\text{lfp}_\emptyset^\sqsubseteq \lambda T \cdot \mathcal{I}^1 \cup T \circ$$
$$\vec{\tau}_P^2),$$

e.g., the maximal trace semantics can be intersected with the partial executions semantics. In the maximal trace semantics, initially the traces containing only a blocking state can be selected, and the transition relation $\tau$ can be applied backwards. At the fixpoint this provides all traces ending in a final state—there are no partial computations, but the computation may start from any point. In partial trace semantics, the transition relation can be systematically applied to obtain the set of all traces descending from an initial set of states $\mathcal{I}$. This set includes partial traces, but all traces originate from the initial states. The intersection of the maximal trace semantics and the partial trace semantics includes all of (and only) the traces starting from $\mathcal{I}$ and ending in $\mathcal{F}$.

Abstract Interpretation is now briefly discussed. Abstract Interpretation is a theory of semantic approximations. Abstract interpretation can be used to approximate a concrete semantics comprising the maximal trace semantics defined above over a concrete domain defined by the complete Boolean lattice $\langle \wp(\tau^*), \subseteq, \emptyset, \Sigma^*, \cup, \cap, \neg \rangle$. The concrete semantics can be either over-approximated or under-approximated.

For example, $\langle C, \leq \rangle$ and $\langle A, \sqsubseteq \rangle$ can be two partial orders. If there exists an abstraction function $\alpha \in C \to A$ and a concretization function $\gamma \in A \to C$ such that $\forall c \in C, a \in A \cdot \alpha(c) \sqsubseteq a \Leftrightarrow c \leq \gamma(a)$, then $\langle \alpha, \gamma \rangle$ can be referred to as a Galois connection, which can be noted by $$\langle C, \leq \rangle \xrightleftharpoons[\alpha]{\gamma} \langle A, \sqsubseteq \rangle.$$

In a Galois connection, 1) the abstraction function uniquely determines the concretization function and vice versa; and 2) the abstraction preserves the upper bounds and the concretization preserves the lower bounds. The composition of Galois connections is a Galois connection: If $$\langle C, \leq \rangle \xrightleftharpoons[\alpha_1]{\gamma_1} \langle A_1, \sqsubseteq \rangle \text{ and } \langle A_1, \leq \rangle \xrightleftharpoons[\alpha_2]{\gamma_2} \langle A_2, \sqsubseteq \rangle,$$

then $$\langle C, \leq \rangle \xrightleftharpoons[\alpha_1 \cdot \alpha_2]{\gamma_1 \cdot \gamma_2} \langle A_2, \sqsubseteq \rangle.$$

The composition enables the step-wise construction of abstract semantics, and it is the theoretical justification to the construction described herein. In some instances, a relaxed form of the abstract interpretation framework in which the abstraction function $\alpha$ is monotonic, may be used. Under the hypothesis presented herein, the fixpoint transfer theorem implies that if $F \in C \to C$ is a monotonic function and $\overline{F} \in A \to A$ commutes with F (e.g., $\alpha \circ F = \overline{F} \circ \alpha$), then $\alpha(\text{lfp}_\perp^{\neq} F) = \text{lfp}_{\alpha(\perp)}^{\sqsubseteq} \overline{F}$.

"Good" execution semantics of the base program P are now described. The "good" execution semantics of P considers only the traces in the maximal execution traces of P that terminate in a non-error state. To formalize this, a Galois connection $$\langle \wp(\Sigma^*), \subseteq \rangle \xrightleftharpoons[\alpha_\mathcal{G}]{\gamma_\mathcal{G}} \langle \wp(\Sigma^*), \subseteq \rangle$$

can be defined with the abstraction $\alpha_\mathcal{G} = \lambda T \cdot T \cap \mathcal{G}$ and the concretization $\gamma_\mathcal{G} = \lambda T \cdot T \cup \mathcal{B}^*$. Good execution trace semantics can be defined as $G[[P]] = \alpha_\mathcal{G}(\overrightarrow{\tau}_P^+)$. It follows from the fact that $\alpha$ is a join morphism, the definition of blocking states, and the fixpoint transfer theorem that $$G[[P]] = (\text{lfp}_\emptyset^{\sqsubseteq} \lambda T \cdot \mathcal{G}^{-1} \cup (\overrightarrow{\tau}_P^2 \circ T)) \cap (\text{lfp}_\emptyset^{\sqsubseteq} \lambda T \cdot \mathcal{J}^{-1} \cup T_\circ)$$
$$\overrightarrow{\tau}_P^2).$$

With reference to FIG. 3, the condition inferrer component 112 is presented. The condition inferrer component includes a trace inferrer component 302 that can infer trace-based environment conditions, including weakest sufficient environment conditions and strongest necessary environment conditions. With specificity, the trace inferrer component 302 can extract sufficient and necessary conditions from G[[P]]. As noted above, a sufficient condition (roughly) ensures that all executions exhibiting the condition are good conditions, while a necessary condition holds for all good conditions. The "optimal" sufficient and necessary conditions can be formalized by suitable abstractions.

First, the Galois connection $$\langle \wp(\Sigma^*), \subseteq \rangle \xrightleftharpoons[\alpha_n]{\gamma_n} \langle \wp(\Sigma^*), \subseteq \rangle$$

can be defined, where the abstraction $$\alpha_n = \lambda T \cdot \{s_0 \overrightarrow{e} \mid \overrightarrow{s} \in T \wedge \overrightarrow{e} = \alpha'(\overrightarrow{s})\}$$

uses the commodity function $\alpha'$ defined as:

$$\alpha'(\overrightarrow{s}) = \begin{cases} \epsilon & \text{if } s = \epsilon \\ s_1 \alpha'(s_2, \ldots, s_{n-1}) & \text{if } \pi_s(s_0) = \text{ret} = f(\ldots) \\ \alpha'(s_1, \ldots s_{n-1}) & \text{otherwise} \end{cases}$$

Intuitively, $\alpha_n$ captures sequences of environment choices from a set of traces T. The abstraction function records the initial state and the state following each method call.

The trace inferrer component 302 can infer approximations for weakest sufficient conditions, which capture the largest set of environment choices that guarantee that the program execution always reaches a good state. Weakest sufficient environmental conditions can be defined formally via the parameterized Galois connection $$\langle \wp(\Sigma^*), \subseteq \rangle \xrightleftharpoons[\alpha_s[S]]{\gamma_s[S]} \langle \wp(\Sigma^*), \subseteq \rangle.$$

The parameterized abstraction is as follows:

$$\alpha_s[S] = \lambda T \cdot \{\alpha_n(\{\overrightarrow{s}\}) \mid \overrightarrow{s} \in \alpha_\mathcal{G}(T) \wedge \forall \overrightarrow{s}' \in S \cap \mathcal{B}^*$$
$$\Rightarrow \alpha_n(\{\overrightarrow{s}\}) \neq \alpha_n(\{\overrightarrow{s}'\})\},$$

and the (parameterized) concretization is $\gamma_s[S] = \lambda T \cdot \{\overrightarrow{s} \mid \overrightarrow{s} \in \gamma_\mathcal{G}(T) \vee \exists \overrightarrow{s}' \in S \cdot \alpha_n(\{\overrightarrow{s}'\}) = \alpha_n(\{\overrightarrow{s}\})\}$. In other words, given a basis set of traces S, the abstraction first selects the traces in T which do terminate in a good state ($\overrightarrow{s} \in \alpha_n(\mathcal{G}(T))$), such that their environmental choices ($\alpha_n(\{\overrightarrow{s}\})$) are different from the choices of all the traces in S that may lead to a bad state ($\overrightarrow{s}' \in S \cap \mathcal{B}^*$). Then, out of the selected traces, the abstraction only retains the environmental choices. The largest set of environment choices guaranteeing that the program P is always correct is $\overrightarrow{\mathcal{S}} \triangleq \alpha_s[\overrightarrow{\tau}_P^+](G[[P]])$.

In an example, with respect to the baseline program Sufficient( ), the weakest sufficient condition $\overrightarrow{\mathcal{S}}$ is as follows:

$$\overrightarrow{\mathcal{S}} = \{\mapsto y \langle y_0, \text{ret} \mapsto r_0 \rangle \langle y, \text{ret} \mapsto r_1 \rangle \mid y_0, r_0 \in \mathcal{V}, 0 < r_1\}$$

e.g., when g returns a positive number, the program is correct; that is, it will never reach any bad state. The program is correct, even if g insurers a stronger property, e.g., the return value is 45 or a positive even number.

The trace inferrer component 302 can also infer approximations of strongest necessary environment conditions, which are now described. It is desirable to obtain the set of environment choices (e.g. input values and values returned from function calls) that characterize good executions. An intuition is that if a sequence of environment choices is obtained, but not in this set, then an execution compatible with those choices will definitely lead to a bad state. In particular, it is desirable to obtain the smallest such set $\vec{\mathcal{N}}$, which can be obtained by abstracting G[[P]].

Therefore, $\vec{\mathcal{N}} \triangleq \alpha_n(G[[P]])$ is the strongest environment property satisfied by good executions of P. If an environment does not make one of the choices admitted by $\vec{\mathcal{N}}$, than the program P will certainly fail. If an environment does make a choice allowed by $\vec{\mathcal{N}}$, then it can be known, by construction, that there is at least one concrete execution of P that terminates in a good state. There may, however, also be concrete executions that terminate in a bad state, as can be shown with reference to the exemplary program Necessary set forth above. Specifically, with reference to the exemplary base program Necessary:

$$\vec{\mathcal{N}} = \{\langle y \mapsto y_0, ret \mapsto r_0 \rangle \mid y_0, r_0 \delta \mathcal{V}, r_0 > 0\}.$$

That is, in all the good executions, the value returned by f is positive. If f is negative, then the program will certainly fail. Otherwise, the program may or may not fail, depending on the non-deterministic choice.

It follows from the results above that $\vec{S} \subseteq \vec{\mathcal{N}}$. In general, it is sound to over-approximate $\vec{\mathcal{N}}$, but not to under-approximated it. Dually, it is sound to under-approximate $\vec{S}$, but not to over-approximate it.

$\vec{S}$ characterizes the largest set of concrete executions that always terminate in a good state. It can be noted that any under-approximation of $\vec{S}$ yields a smaller set of concrete executions that always terminate in a good state. $\vec{\mathcal{N}}$ characterizes the largest set of concrete executions that do not definitely terminate in a bad state. It can be noted that any over-approximation of $\vec{\mathcal{N}}$ yields a larger set of concrete executions, some of which may definitely terminate in a bad state. Accordingly, the The condition inferrer component 112 can also include a state inferrer component 304, which can infer/approximate state-based environment conditions for the baseline program. State-based environment conditions are now described in greater detail. The above-noted trace based environment conditions capture the sequence of environment choices that are necessary or sufficient for program correctness. In some cases, however, the set of environment that are possible at a given program point may be of interest, regardless of the sequence of environment choices made previously. In such cases, the state inferrer component 304 can abstract the trace properties, described above, to state properties by collecting all the states observed at each program point and discarding the environment choices made along the way.

For instance, given a set of traces T, the reachable states abstraction $\alpha_\Sigma$ collects the set of states that reach each program point. Formally, the Galois connection is defined as $$\langle \wp(\Sigma^*), \subseteq \rangle \xrightleftharpoons[\alpha_\Sigma]{\gamma_\Sigma} \langle PC \to \wp(\Sigma^*), \subseteq \rangle,$$

where the abstraction function $\alpha_\Sigma$ is as follows:

$$\alpha_\Sigma = \lambda T \cdot Tpc \cdot \{s_i \mid \exists \vec{s} \in T \cdot \vec{s} = s_0, \ldots, s_i, \ldots, s_{n-1} \wedge \pi(s_i) = pc\},$$

and the concretization $\gamma_\Sigma$ is the expected one.

The weakest state-based sufficient conditions on the environment are the set of states $S_\Sigma \triangleq \alpha_\Sigma(\vec{S})$. The strongest state-based necessary conditions on the environment are the set of states $\mathcal{N}_\Sigma \triangleq \alpha_\Sigma(\vec{\mathcal{N}})$. If entry denotes the entry point of P, then 1) $S_\Sigma$(entry) is the weakest sufficient precondition and 2) $\mathcal{N}_\Sigma$ is the strongest necessary precondition.

For purposes of explanation, reference is now made to the following exemplary program TwoCallSites:

| | TwoCallSites(y,z): | |
|---|---|---|
| 0: | if * | |
| 1: | | ret = f(y) |
| 2: | | x = ret + 1 |
| | else | |
| 3: | | ret = f(z) |
| 4: | | x = ret −1 |
| 5: | assert x > 100 | |

With respect to such exemplary program, the sufficient and necessary state-based conditions coincide: $S_\Sigma(1) = \mathcal{N}_\Sigma(1) = \{\sigma \mid \sigma(ret) > 99\}$ and $S_\Sigma(3) = \mathcal{N}_\Sigma(3) = \{\sigma \mid \sigma(ret) > 101\}$.

Since, as noted above, $\vec{S} \subseteq \vec{\mathcal{N}}$, it follows that $\vec{S_\Sigma} \dot{\subseteq} \vec{\mathcal{N}_\Sigma}$, where $\dot{\subseteq}$ is the pointwise functional extension of $\subseteq$. As with the trace-based environment conditions, it is sound to cause the state inferrer component 304 over-approximate $\mathcal{N}_\Sigma$ and to under-approximate $S_\Sigma$.

The condition inferrer component 112 can further comprise a call inferrer component 306 that can infer/approximate method call conditions for the baseline program. The above-described state-based environment conditions collect the possible environments at each program point. In some cases, one may only be interested in the environment conditions following a method call. Such abstraction is referred to as method call conditions. Callees can be the set of invoked functions. Then the weakest sufficient condition on function calls (e.g., the largest set of states that guarantees the program always terminates in a good state) is the intersection of all sufficient states at return points. The following monotonic abstraction function can be used, which is set forth as follows:

$$\alpha_S = \lambda r.\lambda f. \bigcap_{pc \in Callees(f)} r(pc).$$

Therefore, $S \triangleq \alpha_S(\vec{S_\Sigma})$ are the weakest sufficient conditions on callees.

With reference to the above presented program TwoCallSites, the weakest sufficient condition on f is $S(f) = \{\sigma \mid \sigma(ret) > 101\}$. No matter which branch is taken, if f returns a value larger than 101, the assertion holds.

The necessary call conditions are given by the Galois connection $$\langle PC \to \wp(\Sigma), \subseteq \rangle \underset{\alpha_\Sigma}{\overset{\gamma_\Sigma}{\rightleftarrows}} \langle Callees \to \wp(\Sigma), \subseteq \rangle.$$

The abstraction function $\alpha_\Sigma$ merges the states after all implications of a given callee f. The abstraction function can be formally set forth as follows:

$$\alpha_{\mathcal{N}} = \lambda r. \lambda f. \bigcap_{pc \in Callees(f)} r(pc),$$

and the concretization function is $$\gamma_{\mathcal{N}} = \lambda n. \lambda pc. \begin{cases} n(f) & pc \in AfterCall \wedge pc \in Callees(f) \\ \Sigma & \text{otherwise} \end{cases}.$$

Therefore, $\mathcal{N} \triangleq \alpha_{\mathcal{N}}(\mathcal{N}_\Sigma)$ are the strongest conditions on the callees which are necessary for the program to be correct.

Referring again to the exemplary program TwoCallSites set forth above, the strongest necessary condition on f is $\mathcal{N}(f) = \{\sigma | \sigma(\text{ret}) > 99\}$, e.g., if the return value from f is smaller or equal than 99, then both assertions will fail.

In summary, the condition inferrer component 112 can analyze the base program and infer any of the types of environmental conditions set forth above, and can utilize any suitable approximation techniques when performing such inference.

With reference to FIG. 4, a functional block diagram of the inserter component 120 is shown. The inserter component 120 is configured to receive the correctness conditions inferred for the baseline program, the baseline program, and the new program, and insert the correctness conditions at appropriate locations in the new program. To that end, the inserter component 120 includes a comparer component 402 that can perform a syntactic comparison between the baseline program P and the new program P'. Thus, the correctness conditions inferred for the baseline program provide a semantic baseline to allow for the reporting of only the new errors in the modified program P'. No constraint need be imposed on how much P and P' differ. For purposes of explanation, it can be assumed that a function $\delta \in PC(P) \to PC(P') \cup \{\bot\}$ is known that captures the syntactic changes between P and P'. The $\delta$ function maps a program point from the base program to its corresponding point in the new program or to $\bot$ if the program point has been removed. For purposes of explanation, it can be assumed that variables from P are not renamed in P'.

The formalism described herein is agnostic to the method used to compute $\delta$; it can be considered as a parameter of the analysis. There are several conventional techniques for computing $\delta$.

The image of a trace with respect to $\delta$ can be defined as follows:

$$\alpha_\delta = \lambda \vec{s}. \begin{cases} \epsilon & \text{if } \vec{s} = \epsilon \\ s\alpha(\vec{s}') & \text{if } \vec{s} = s\vec{s}' \wedge \delta(\pi(s)) \neq \bot \\ \alpha(\vec{s}') & \text{otherwise} \end{cases}$$

That is, the comparer component 402 can employ $\alpha_\delta(s)$ to abstract away all the states in $\vec{s}$ that do not refer to a program point in P'.

The inserter component 120 further includes a filter component 404 that filters traces in the concrete semantics of P' which are compatible with $\vec{S}$. The filtered maximal trace semantics of P' can be formalized as follows:

$$\vec{\tau}_{P'}^+ \lfloor \vec{S} = \{\vec{s} \in \vec{\tau}_{P'}^+, | \exists \vec{t} \in \vec{S} \cdot \alpha_\delta(\vec{t}) = \alpha'(\vec{s})\},$$

e.g., the filter component 404 causes only those traces in $\vec{\tau}_{P'}^+$ to be retained, such that the sequence of choices made by the environment is compatible with the trace condition $\vec{S}$. This filtering then yields a subset of the concrete traces, e.g., $\vec{\tau}_{P'}^+ \lfloor \vec{S} \subseteq \vec{\tau}_{P'}^+$.

The inserter component 120 can inject sufficient conditions $\vec{S}$ from P into the new program P', as well as necessary conditions into the new program P'. With respect to semantic baselining with sufficient conditions, it can be known by construction that $\vec{\tau}_{P'}^+, \lfloor \vec{S} \cap \mathcal{B}^* = \emptyset$, since the sufficient conditions $\vec{S}$ were sufficient to eliminate all the bad runs for P. Therefore, if the sufficient conditions $\vec{S}$ are injected into P', and at least one bad execution is found (formally $\vec{\tau}_{P'}^+, \lfloor \vec{S} \cap \mathcal{B}^* \neq \emptyset$), then the new program has added a bad behavior with respect to P. When P' introduces a bad behavior that was not present in P, it can be said that P' has caused a regression. Another way of viewing the regression is that P' needs stronger environmental conditions than P. In general, the following result holds.

Theorem 1: If $\vec{\tau}_{P'}^+ \lfloor \vec{S} \cap \mathcal{B}^* \neq \emptyset$, then P' has a definite regression with respect to P.

With respect to the inserter component 120 injecting necessary conditions into P', in an example, it can be assumed that no bad execution is found (e.g., formally $\vec{\tau}_{P'}^+, \lfloor \vec{\mathcal{N}} \cap \mathcal{B}^* \neq \emptyset$). It can be concluded that under the same environment conditions that hold for all the good runs (and maybe some of the bad runs) of P, P' has no bad runs. As a consequence, 1) P' does not require stronger environmental hypotheses than P for correctness; and 2) if $\vec{\mathcal{N}}$ were only necessary but not sufficient for the absence of bad runs in P, then P' fixed the errors in P. Thus, the following theorem holds:

Theorem 2: When $\vec{\tau}_{P'}^+, \lfloor \vec{\mathcal{N}} \cap \mathcal{B}^* \neq \emptyset$, P' has no more bad behaviors than P, and P' fixed a bug in P.

It can further be noted that, in general, the strongest necessary conditions for P may not be necessary conditions for P' any longer. For instance, if P' removes an assertion from P, the necessary conditions for P may preclude some good runs in P'.

The inserter component 120 also includes an approximator component 406, which can generate approximations for inserting necessary and sufficient conditions into the new program P'. The semantic filtering and the two theorems above provide the best theoretical solution to the problem of cross-version correctness condition injection and, correspondingly, to the problem of semantic baselining. Such an approach, however, may not be practical because the exact computation of the success semantics and history conditions is often infeasible for real programs. Thus, to solve the problem of semantic baselining in practice, some approximation may be needed.

It can be noted that the use of the weakest sufficient conditions Equation 167 is sound and complete for detecting regressions. It guarantees that all regressions of P', with respect to P, are captured. If an under approximation $\underline{\vec{S}} \subset \vec{S}$ is considered, then all the regressions captured are definite regressions with respect to P. Some regressions with respect to P may be missed, but not with respect to $P\underline{\vec{S}}$.

Reference is again made to the programs Sufficient, Sufficient', and Sufficient'WithRegression set forth above. For example, the condition inferrer component 112 can extract the sufficient condition ret>10. When such condition is injected into Sufficient'WithRegression by the inserter component 120, the analyzer tool 106 can prove the assertion and no warning is raised. Thus, the relative completeness of Sufficient'WithRegression with respect to Sufficient proved. Sufficient$_{ret>10}$ is proved.

It can also be noted that the use of the strongest necessary conditions is sound and complete for detecting bug fixes. If an over-approximation $\overline{\mathcal{N}} \supset \vec{\mathcal{N}}$ is considered, than all of the bug fixes found are definite bug fixes with respect to P (soundness). Some bug fixes, however, may be missed (incompleteness). For instance, with respect to the programs Necessary and Necessary', the condition ret>−10 may be extracted from Necessary by the condition inferrer component 112; in such case, it cannot be proved that Necessary' fixed Necessary.

Based at least in part upon the monotonicity and the soundness of the extractions noted above, the results can be lifted to the state condition semantics and the call condition semantics. Sound, yet computable approximations, e.g., $\underline{S}_\Sigma$, $\overline{\mathcal{N}}_\Sigma$ and $\underline{S}, \overline{\mathcal{N}}$ can be used to obtain sound and relatively complete condition injection.

This only solves half of the baselining problem, however, since it has been assumed that the syntactic change function δ is given. In general, automatically constructing δ is relatively impossible because several different δ functions can characterize the transformation from P to P'. For example, reference is made to the program TwoCallSites noted above, as well as to the program TwoCallSites' shown below to illustrate difficulties in constructing δ functions.

| TwoCallSites'(w) |
| --- |
| 0: ret = f(w) |
| 1: x = ret |
| 2: assert x > 100 |

The base program, TwoCallSites, includes two invocations off, one at program point 1, the other at program point 3. The new program, TwoCallSites', contains only one invocation off. Through syntactic analysis, it cannot be ascertained with any certainty which, if either, of the two calls in the base program corresponds in the call to f in the new program. In other words, it is not possible to determine which δ function is correct out of the following two examples: $\langle 1 \mapsto 0, 3 \mapsto \bot \rangle$ or $\langle 1 \mapsto \bot, 3 \mapsto 0 \rangle$.

For these exemplary programs, it is ambiguous as to which δ function is the correct choice. This arbitrary choice, however, will have semantic ramifications because each state corresponding to a call to f in the base program has a different correctness condition associated with it. That is, each equally valid choice of δ will result in a different correctness condition being ported to P', which is undesirable.

Many of the problems associated with constructing δ can be avoided by using the call condition semantics instead of the state condition semantics. This reduces the problem of computing δ for all program points to the much simpler problem of matching method names across program versions. As long as methods are not renamed, such approach is quite reliable. Thus, the comparer component 402 can compare method names across the base program and the new program. For instance, with reference to TwoCallSites and TwoCallSites', the method f is called in both versions of the program. Since the call conditions are merged for all indications of a function, changing the number of calls to a particular function presents no difficulty. This can be contrasted with the ambiguity introduced by changing the number of calls to f during an attempt to construct a δ to port state conditions across versions.

For each function f that is called in both P and P', it can be assumed that the correctness condition ϵ(f) after all calls to f in P', where ϵ(f) can be either $\underline{S}(f)$ or $\overline{\mathcal{N}}(f)$, depending on which kind of inference is desired. Thus, the correctness conditions can be treated as if they were post conditions for f that f's body does not need to prove. The injected program $P_\epsilon$ can be readily analyzed, resulting in an analysis that can be reported to the developer 126.

Other sources of approximation can also be considered. For instance, the sources of approximations noted above are the under/over approximation of the extracted correctness conditions and the abstraction level at which such conditions are observed. Practical static techniques typically make many other approximations. All static verifiers and analyzers over-approximate the concrete semantics $\tau^+$. When over-approximation adds execution traces that end in an error state, the analyzers will report false alarms. Semantic baselining is just as suitable for suppressing false alarms due to over-approximation as it is for suppressing false alarms due to unknown code. When an analyzer loses precision in a way that causes a false alarm, a condition to suppress that false alarm is simply assumed in the next version of the program.

For example, semantic baselining can suppress false alarms due to imprecise handling of loops. If a loop is considered to be a black box (e.g., extracted into an unknown function), correctness conditions can be inferred for the black box corresponding to the loop in the base program and ported to the new program. False alarms due to imprecise handling of concurrency, bitwise operations, unbound data structures, can be handled in a similar manner.

Finally, a subtle problem can arise due to the often forgotten fact that practical analysis tools are not monotonic. That is, it is possible for an analyzer to compute a less precise result given more precise inputs (e.g., more assumptions). This can happen for several reasons: 1) the use of widenings, timeouts, non-monotonic state space finitization, etc. In the context of semantic baselining, this can result in an odd case were analyzing the new program P' yields less warnings when compared to analyzing the refined program $P'_\epsilon$. This can be solved by considering the intersection of the warnings generated by the analyses of P and $P_\epsilon$. It can be noted that computing this intersection does not pose any problems with respect to syntactic matching because only syntactic differences between P' and $P'_\epsilon$ are the addition of the correctness conditions ϵ.

Figure 5:
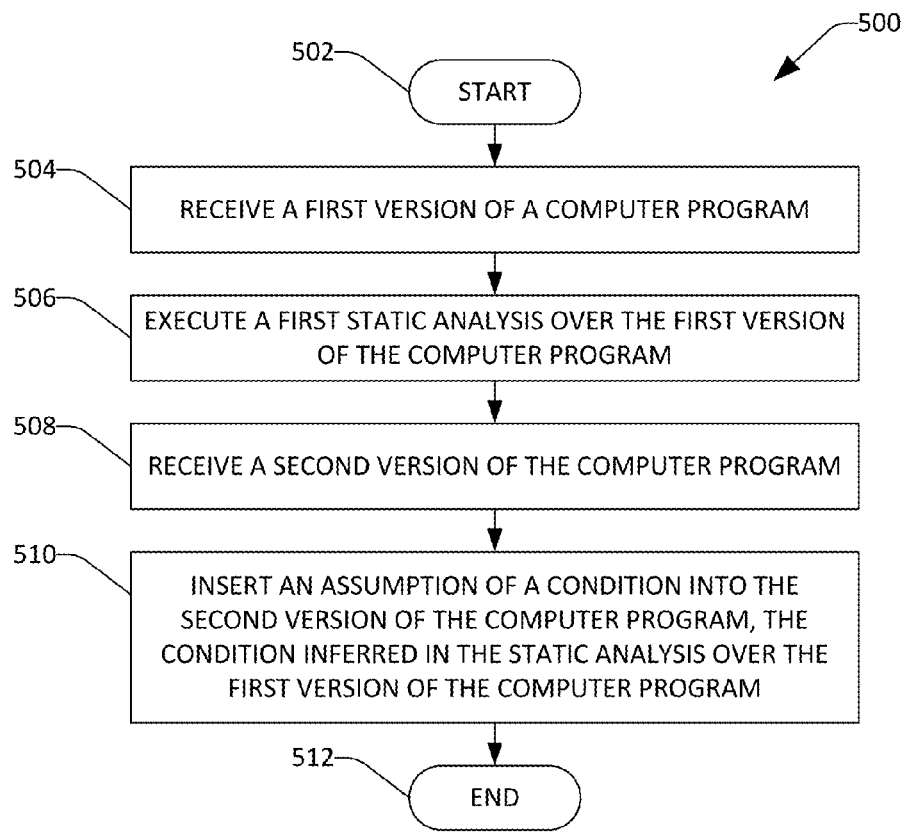
FIG. 5 is a flow diagram illustrating an exemplary methodology for inserting an assumption of a correctness condition into a computer-executable program.
Figure 6:
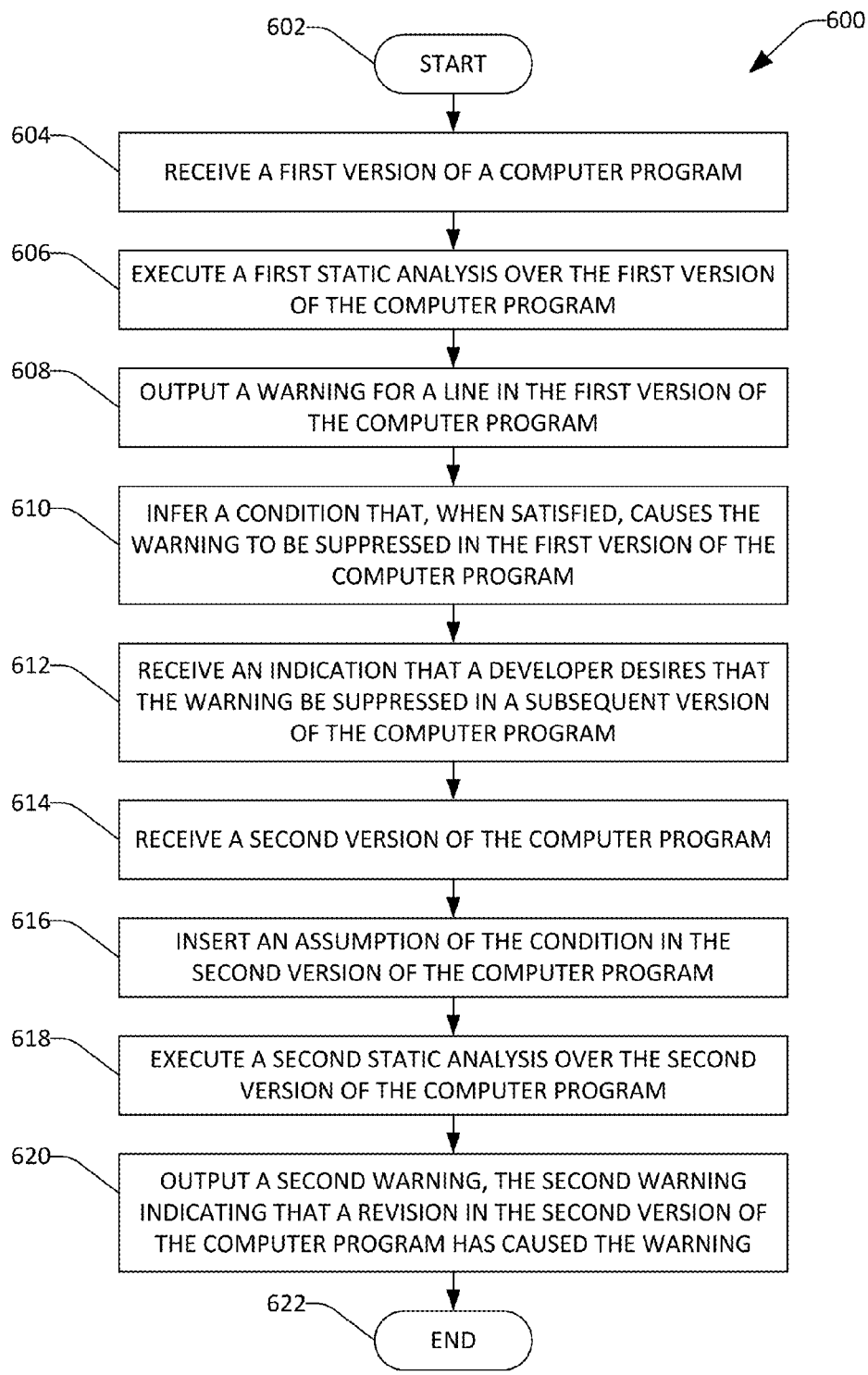
FIG. 6 is a flow diagram illustrating an exemplary methodology for suppressing previously analyzed warnings output by a static analysis and verification tool.

FIGS. 5-6 illustrate exemplary methodologies relating to inferring correctness conditions for a baseline program and inserting such conditions into a new program is illustrated. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now were referring to FIG. 5, an exemplary methodology 500 that facilitates inserting an assumption of a condition into computer-executable code (a program) is illustrated. The methodology 500 starts at 502, and at 504 a first version of a computer program is received. For instance, this program can be written in any suitable programming language, including C, C#, C++, Java or the like. At 506, a first static analysis over the first version of the computer program is executed. Executing the first static analysis includes identifying a warning in the first version of the computer program that corresponds to a first location in the first version of the computer program. Executing the first static analysis over the first version of the computer program also includes inferring a condition for the warning, wherein when the condition is assumed at the first location in the first version of the computer program, the warning is suppressed when the first static analysis is executed over the first version of the computer program. In other words, a correctness condition is inferred (e.g., a method call condition). At 508, a second version of the computer program is received. The second version of the computer program is non-identical to the first version of the computer program and includes revisions to the first version of the computer program.

At 510, an assumption of the condition is inserted at a second location in the second version of the computer program, such that the warning is suppressed when a second static analysis is executed over the second version of the computer program. Thus, the warning is an old warning and is not presented to the developer as being a new warning. In some examples, however, a second static analysis, when executed over the second version of the computing program results in identification of a second warning, wherein the second warning is caused by a revision to the first version of the computer program when developing the second version of the computer program. In this case, the second warning can be displayed to a developer as a new warning. The assumption of the condition can be inserted into, for instance, a function entry point or a method call. The methodology 500 completes at 512.

Now referring to FIG. 6, an exemplary methodology 600 for outputting warnings pertaining to code when a static analysis is undertaken over such code is illustrated. The methodology 600 starts at 602, and at 604, a first version of a computer program is received. At 606, a first static analysis is executed over the first version of the computer program, and at 608 a warning for a particular line in the first version of the computer program is output based upon the executing of the first static analysis over the first version of the computer program. Specifically, executing the first static analysis over the first version of the computer program can include identifying a warning at a first line of a plurality of lines of computer-executable code in the first version of the computing program, and inferring a condition for the warning that, when assumed, causes the warning to be suppressed.

At 610, a condition is inferred that, when satisfied, causes the warning to be suppressed in the first version of the computer program. At 612, an indication is received that a developer desires that the warning be suppressed in a subsequent version of the computer program. That is, the developer has indicated that the error is spurious or not worth fixing.

At 614, a second version of the computer program is received, and at 616, an assumption of the condition is inserted into the second version of the computer program. As noted above, this assumption can be inserted at a function entry point or a method call in the second version of the computer program.

At 618, a second static analysis over the second version of the computer program is executed, wherein the second version of the computer program has the assumption of the condition inserted therein. At 620, a second warning is output based upon the executing of the second static analysis over the second version of the computer program, the second warning indicating that a revision included in the second version of the computer program has caused the second warning. The methodology 600 completes at 622.

Figure 7:
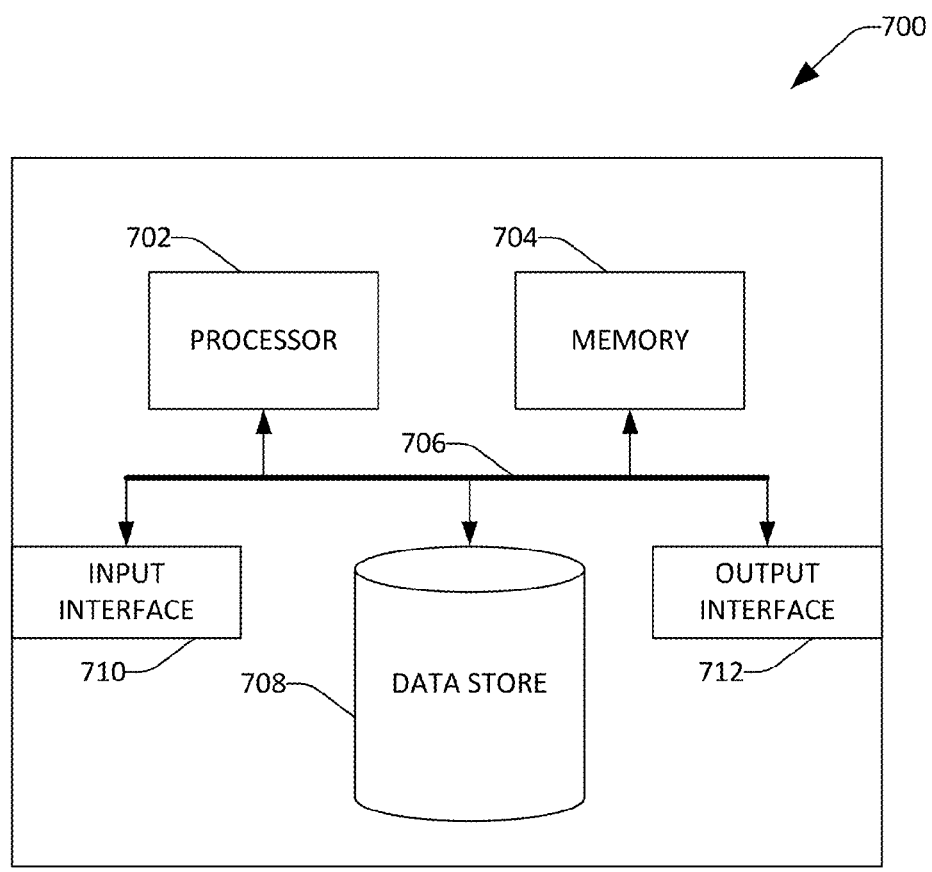
FIG. 7 is an exemplary computing system.

Referring now to FIG. 7, a high-level illustration of an exemplary computing device 700 that can be used in accordance with the systems and methodologies disclosed herein is illustrated. For instance, the computing device 700 may be used in a system that infers correctness conditions for a baseline program. By way of another example, the computing device 700 can be used in a system that supports inserting the correctness conditions into a new program. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store inferred correctness conditions, a baseline program, a new program, etc.

The computing device 700 additionally includes a data store 708 that is accessible by the processor 702 by way of the system bus 706. The data store 708 may include executable instructions, inferred correctness conditions, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
    receiving a first version of a computer program;
    executing a first static analysis over the first version of the computer program, wherein executing the first static analysis comprises:
        identifying a warning in the first version of the computer program corresponding to a first location in the first version of the computer program; and
        inferring a condition that causes the warning to be suppressed if another static analysis were to be executed over the first version of the computer program;
    displaying the warning on a display of a computing device operated by a developer of the computer program;
    receiving an indication that the developer has requested that the warning displayed on the display of the computing device is to be suppressed in subsequent versions of the computer program;
    receiving a second version of the computer program, the second version of the computer program being non-identical to the first version of the computer program;
    inserting an assumption of the condition in the second version of the computer program;
    executing a second static analysis over the second version of the computer program, wherein when the second static analysis is being executed, the warning is suppressed based upon the assumption of the condition inserted in the second version of the computer program; and
    presenting warnings on the display of the computing device based upon the second static analysis executed over the second version of the computer program, wherein the warnings presented on the display fail to include the warning, and further wherein the warning would be displayed but for the warning being suppressed based upon the assumption of the condition inserted in the second version of the computer program.

2. The method of claim 1, further comprising:
    identifying a second warning based upon the executing of the second static analysis over the second version of the computer program, the second warning caused by a revision to the first version of the computer program when generating the second version of the computer program,
    wherein the second warning is included in the warnings.

3. The method of claim 1, wherein the condition is inferred to be a sufficient condition, the sufficient condition guaranteeing that the first version of the computer program, when executed, reaches a satisfactory state from the first location when the sufficient condition is assumed.

4. The method of claim 1, wherein the condition is inferred to be a necessary condition, the necessary condition expressing that if the condition is not satisfied, the first version of the computer program, when executed, reaches an unsatisfactory state from the first location.

5. The method of claim 1, wherein the inferring the condition for the warning comprises:
    identifying execution traces through the first version of the computer program that terminate in a non-error state; and
    inferring the condition for the warning based at least in part upon the identifying of the execution traces through the first version of the computer program that terminate in the non-error state.

6. The method of claim 5, wherein the condition pertains to environment conditions following a method call.

7. The method of claim 5, further comprising filtering an execution trace from the execution traces that is incompatible with the second version of the computer program.

8. The method of claim 1 executed in an integrated development environment (IDE).

9. The method of claim 1, wherein the assumption is inserted into the second version of the computer program at one of a function entry point or a method call.

10. A computing device, comprising:
a processor; and
memory that stores instructions that, when executed by the processor, cause the processor to perform acts comprising:
executing a first static analysis over a first version of computer code, wherein executing the first static analysis over the first version of the computer code comprises identifying a warning in the first version of the computer code corresponding to a location in the first version of the computer code;
displaying the warning on a display for viewing by a developer of the computer code;
receiving an indication from the developer that the warning is to be suppressed when static analysis is performed over subsequent versions of the computer code;
inferring a condition responsive to receiving the indication that the warning is to be suppressed, the condition inferred based upon the first static analysis executed over the first version of computer code, wherein the condition, when assumed in the first version of computer code, causes the first version of computer code to reach a non-error state when the first version of the computer code is executed;
instrumenting a second version of the computer code with an assumption of the condition;
executing a second static analysis over the second version of the computer code with the assumption of the condition inserted therein, wherein when the second static analysis of the second version of the computer code is performed, the assumption of the condition inserted into the second version of the computer code causes the warning, which would otherwise be output, to be suppressed; and
displaying warnings on the display based upon the second static analysis being executed over the second version of the computer code, wherein the warnings fail to include the warning due to the warning being suppressed.

11. The computing device of claim 10, the acts further comprising outputting a second warning based upon the second static analysis being executed over the second version of the computer code with the assumption of the condition inserted therein, wherein the second warning indicates that a revision to the first version of the computer code in the second version of the computer code has caused the warning.

12. The computing device of claim 10, the acts performed by the processor when the processor executes an integrated development environment application.

13. The computing device of claim 10, the condition being one of a necessary condition or a sufficient condition, the necessary condition holding whenever the first version of the computer code, when executed, reaches a satisfactory state from the location, the sufficient condition guaranteeing that the first version of the computer code, when executed, reaches the satisfactory state from the location when the sufficient condition is assumed.

14. The computing device of claim 10, wherein instrumenting the second version of the computer code comprising placing the assumption of the condition at a method call or function entry point in the second version of the computer code.

15. The computing device of claim of claim 10, the first version of the computer code and the second version of the computer code written in one of C programming language or C++ programming language.

16. A computer-readable storage medium comprising instructions that, when executed by a processor, cause the processor to perform acts comprising:
receiving a first version of a computer program, the first version of the computer program comprising a first plurality of lines of computer-executable code;
executing a first static analysis over the first version of the computer program, wherein executing the first static analysis comprises:
identifying a warning at a first line of the first plurality of lines of computer-executable code; and
inferring a condition for the warning that, when assumed, causes the warning to be suppressed;
displaying the warning on a display of a computing device operated by a developer of the computer program;
receiving a second version of the computer program, the second version of the computer program comprising a second plurality of lines of computer-executable code, the second version of the computer program including revisions made to the first version of the computer program subsequent to the first static analysis being executed over the first version of the computer program;
receiving an indication from the developer that the warning is to be suppressed when executing a second static analysis over the second version of the computer program;
receiving an indication that the second static analysis is to be executed over the second version of the computer program;
responsive to receiving the indication that the second static analysis is to be executed over the second version of the computer program, automatically inserting an assumption of the condition into the second version of the computer program at a second line in the second plurality of lines;
subsequent to inserting the assumption of the condition into the second version of the computer program, executing the second static analysis over the second version of the computer program; and
displaying warnings on the display based upon the second static analysis being executed over the computer program, wherein the warnings fail to include the warning based upon the assumption of the condition being inserted into the second version of the computer program at the second line in the second plurality of lines.

17. The computer-readable storage medium of claim 16, wherein the condition is inferred to be a necessary condition, the necessary condition expressing that if the condition is not satisfied, the first version of the computer program, when executed, reaches an unsatisfactory state from the first line.

18. The computer-readable storage medium of claim 16, wherein inferring the condition for the warning comprises:
identifying execution traces through the first version of the computer program that terminate in a non-error state; and
inferring the condition for the warning based at least in part upon the identifying of the execution traces through the first version of the computer program that terminate in the non-error state.

19. The computer-readable storage medium of claim 16, wherein inserting the assumption of the condition into the second version of the computer program at a second line in the second plurality of lines comprises inserting the assumption at a method call or function entry point in the second version of the computer program.

20. The computer-readable storage medium of claim 16, the acts further comprising: identifying a second warning based upon the second static analysis being executed over the second version of the computer program, the second warning caused by a revision to the first version of the computer program when generating the second version of the computer program, wherein the second warning is included in the warnings displayed on the display.

* * * * *